(12) United States Patent
Conti et al.

(10) Patent No.: US 6,980,822 B2
(45) Date of Patent: Dec. 27, 2005

(54) METHOD AND DEVICE FOR CONTROL OF THE TRANSMISSION POWER OF A CELLULAR MOBILE TELEPHONE

(75) Inventors: Patrick Conti, Grand-Lancy (CH); Friedbert Berens, Geneva (CH)

(73) Assignee: STMicroelectronics N.V., Amsterdam (NL)

( * ) Notice: Subject to any disclaimer, the term of this patent is extended or adjusted under 35 U.S.C. 154(b) by 890 days.

(21) Appl. No.: 10/000,612

(22) Filed: Oct. 24, 2001

(65) Prior Publication Data

US 2002/0052215 A1 May 2, 2002

(30) Foreign Application Priority Data

Oct. 27, 2000 (EP) .......................................... 00123332

(51) Int. Cl.[7] .............................................. H04B 7/00
(52) U.S. Cl. ..................... 455/522; 455/116; 455/127.2
(58) Field of Search .............................. 455/522, 116, 455/127.1–127.3, 550.1, 91, 232.1, 253.2; 375/295–297

(56) References Cited

U.S. PATENT DOCUMENTS

| | | | |
|---|---|---|---|
| 6,329,875 B1 * | 12/2001 | Ishida et al. ................... 330/51 |
| 6,342,812 B1 * | 1/2002 | Abdollahian et al. ... 330/124 R |
| 6,532,357 B1 * | 3/2003 | Ichikawa ....................... 455/126 |
| 6,675,000 B1 * | 1/2004 | Ichikawa ..................... 455/127.3 |
| 2002/0176513 A1 * | 11/2002 | Gouessant et al. ............ 375/297 |
| 2003/0114121 A1 * | 6/2003 | Kikuchi ............................ 455/91 |
| 2004/0185805 A1 * | 9/2004 | Kim et al. .................. 455/114.3 |

FOREIGN PATENT DOCUMENTS

EP   0883250   12/1998   ............ H04B/1/04

OTHER PUBLICATIONS

Patent Abstracts of Japan, vol. 1998, No. 13, Nov. 30, 1998 & JP 10224530A (Minolta Co. Ltd.), Aug. 21, 1998.

* cited by examiner

*Primary Examiner*—Nick Corsaro
*Assistant Examiner*—Edan Orgad
(74) *Attorney, Agent, or Firm*—Lisa K. Jorgenson; Allen, Dyer, Doppelt, Milbrath & Gilchrist, P.A.

(57) ABSTRACT

A cellular telephone includes a plurality of power amplifiers having a common operating region. If one of the amplifiers has to be deselected, a desired moment for the switching to another amplifier is defined based upon a predetermined transmission interrupt criterion. The power continues to be adjusted with the currently selected amplifier until the instant of switch over. Switching to the other amplifier may then be performed after the transmission has been interrupted.

37 Claims, 8 Drawing Sheets

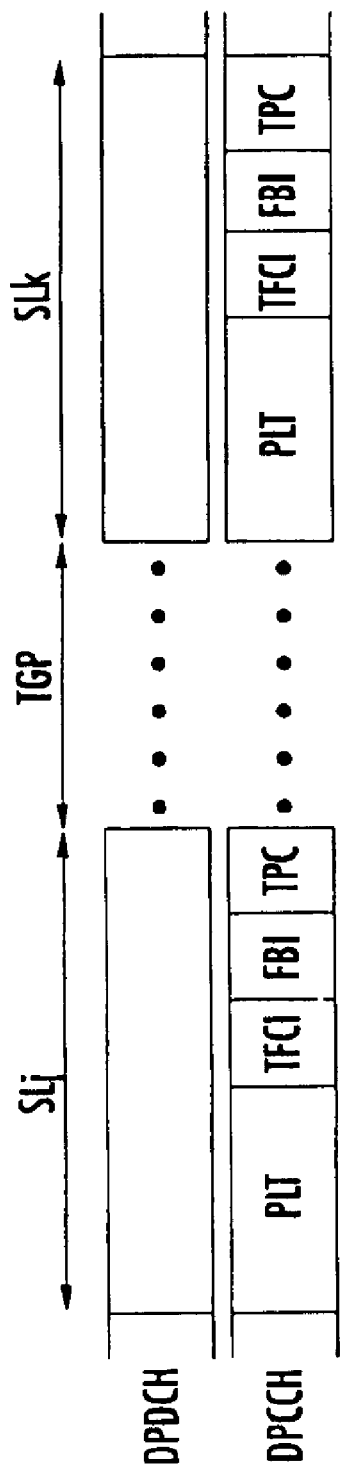
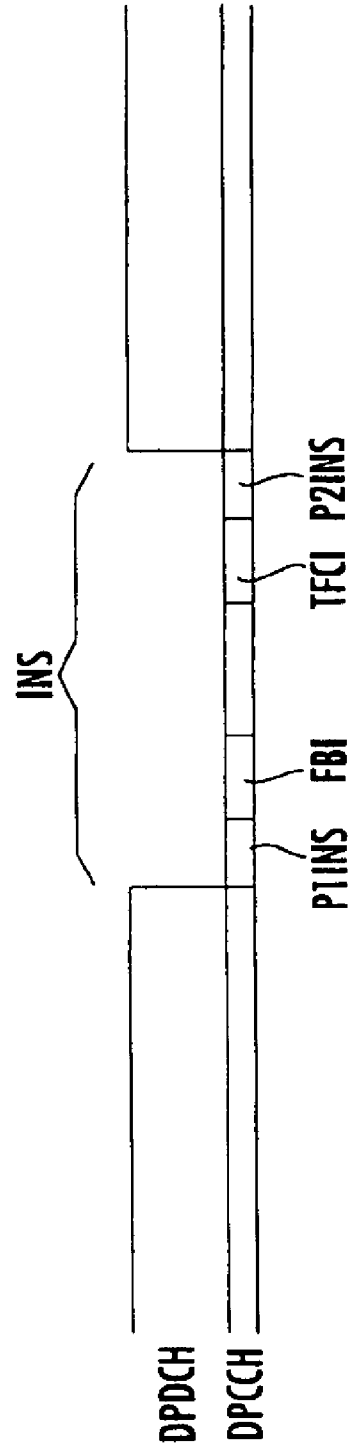

METHOD AND DEVICE FOR CONTROL OF THE TRANSMISSION POWER OF A CELLULAR MOBILE TELEPHONE

FIELD OF THE INVENTION

The present invention relates to the field of wireless communications systems, and, more particularly, to Code-Division Multiple Access (CDMA) systems, such as the various mobile telephone systems based on the CDMA standard (e.g., the CDMA 2000 system, the Wide Band CDMA (WCDMA) system, or the IS-95 standard).

BACKGROUND OF THE INVENTION

In a wireless communications system, a base station communicates with a plurality of remote terminals, such as cellular mobile telephones. Frequency-Division Multiple Access (FDMA) and Time-Division Multiple Access (TDMA) are the traditional multiple-access schemes for delivering simultaneous services to a certain number of terminals. The basic idea underlying the FDMA and TDMA systems is that of sharing the available resources among several frequencies or several time slots. This is done such that several terminals can function simultaneously without causing interference.

In contrast to those schemes using frequency division or time division, CDMA schemes allow multiple users to share a common frequency and a common time channel by using coded modulation. More precisely, as is well known to the person skilled in the art, a scrambling code is associated with each base station, which makes it possible to distinguish one base station from another. Moreover, an orthogonal code, referred to as the "OVSF code", is allocated to each remote terminal (such as a cellular mobile telephone, for example). All the OVSF codes are orthogonal to each other, which makes it possible to distinguish one remote terminal from another.

Before sending out a signal on the transmission channel for a remote terminal, the signal has been scrambled and spread by the base station using the scrambling code of the base station and the OVSF code of the remote terminal. In CDMA systems, it is further possible to distinguish those which use a separate frequency for transmission and reception (CDMA-FDD system) and those which use a common frequency for transmission and reception, but separate time domains for transmission and reception (CDMA-TDD system).

The invention applies advantageously to the communications systems of the CDMA type, and more particularly to the systems of the CDMA-FDD type. In the remote terminals, such as cellular mobile telephones, a single power amplifier is typically used for transmission. This power amplifier generally has a wide range of radio frequency power operation. Further, the power amplifier may continually be in operation during the communications, which is particularly true in CDMA-FDD systems.

Moreover, the transmission power delivered by the power amplifier can vary within a predetermined range of powers, typically from −50 dBm to 24 dBm in the case of third-generation mobile telephones. Within this power range, the transmission power is adjusted on the basis of power information received regularly by the telephone and originating from the base station. The power amplifier is currently designed to exhibit the greatest efficiency for the maximum transmission power.

In contrast, for intermediate or low powers, a significant deterioration in the efficiency occurs. This is because the quiescent current of the power amplifier does not change while the transmitted power decreases. Thus, in such operating modes at low or intermediate power, the efficiency (i.e., yield) decreases drastically to a value on the order of a few percent (e.g., 1 to 5%). Thus, a loss of energy results within the battery, which reduces its life span.

SUMMARY OF THE INVENTION

One object of the invention is to control the transmission power of a remote terminal, such as a cellular mobile telephone, to improve its efficiency without affecting the quality of the service transmitted.

This and other objects, features, and advantages in accordance with the invention are provided by a method for controlling the transmission power of a cellular mobile telephone within a predetermined range of powers, where the transmission power is adjusted based upon power information regularly received by the telephone. The telephone may be equipped with at least two power amplifiers which can be selected individually, and which together are capable of covering the entire power range. These two amplifiers respectively possess two different preferred operating regions and a common operating region.

One of the amplifiers is associated with each point of the power range based upon an efficiency criterion. Thus, in practice, it would be possible to associate with each point of the power range the amplifier the efficiency of which is the highest for this point. In the presence of power information received corresponding to a point of the common region, it is verified whether this power information corresponds to the amplifier currently selected. If this is the case, this amplifier continues to be used to deliver the transmission power.

In the opposite case, a changeover switching time range is defined to extend from the instant of reception of the power information over a predetermined duration compatible with the limits of the common region. The time limits of an interrupt time range, lying within the switching range, are also defined as a function of a predetermined criterion for transmission interruption.

The transmission power continues to be adjusted, possibly based upon new power information received, with the amplifier currently selected until the occurrence of the interrupt range. Then, if the last power information received before the occurrence of the interrupt range still does not correspond to the currently selected amplifier, transmission is inhibited during the interrupt range, the power amplifier associated with the last power information is selected, and transmission is reactivated with the new amplifier selected.

In other words, when the transmission power required by the base station reaches a limit for the currently selected power amplifier, this power amplifier should be switched over. However, since this power amplifier (which is to be deselected) and the new power amplifier (which is to be selected, and the characteristics of which will make it possible to obtain better efficiency for the required power) have a common operating region, the switching point can be chosen flexibly within a time range (i.e., switching range). This time range corresponds to the limits of the common operating region. Within this switching range, the invention makes provision to choose the instant of switching which will give rise to a minimum disturbance in the transmission.

Generally, the information transmitted is formed by fragments known as "chips", and is transported in successive frames each subdivided into a predetermined number of intervals or "slots". The duration of the switching range is then advantageously on the order of a few slots, e.g., four to eight slots. Likewise, the duration of the interrupt time range is advantageously on the order of a few chips, e.g., two to four chips.

Furthermore, the transmission interrupt criterion may include the choice of at least one predetermined particular event capable of occurring within a transmission. The predetermined particular event may have a predetermined impact on the bit error rate (BER) in the case of a transmission interruption upon the occurrence of this particular event. The characteristics of the transmission may be analyzed to detect the possible presence of this predetermined particular event within the switching range. If this presence is detected, the interrupt time range is placed during the occurrence of this particular event. Thus, the interruption of the transmission to allow switching-over of the amplifiers will have the desired predetermined impact on transmission, which is in practice a negligible impact.

It may be particularly advantageous for the transmission interrupt criterion to include the choice of a group of several predetermined particular events capable of occurring in the course of a transmission. The sequencing of these particular events may be according to an order of priority which is predetermined based upon their respective impacts on the bit error rate in the event of an interruption of transmission upon the occurrence of these particular events. Thus, for example, the particular event having the highest priority will correspond to the one for which the impact on the bit error rate will be the slightest if the interruption in transmission takes place during the occurrence of this particular event.

The particular event which will then be allocated the lowest priority will be the one which will have the greatest impact on the bit error rate, if the interruption of the transmission takes place in the course of this particular event. The characteristics of the transmission are then advantageously analyzed by considering the order of priority (in such a way as to detect the possible presence) during the changeover switching range of a predetermined particular event of the group. The interrupt time range is placed during the occurrence of the first particular event thus detected in the order of priority.

In other words, if the presence of the particular event having the highest priority is detected, it is in the course of the occurrence of this event that the interrupt range will be placed. In contrast, if a particular event allocated the highest priority is not detected, then a search will be done to detect an event having a lower priority, and so on. As soon as a particular event is detected, the interrupt range is placed during the occurrence of this particular event.

Thus, when the information transmitted includes data and control indications, and is transported within successive frames each subdivided into a predetermined number of slots, the control indications (which include feedback information and transport format combination indicators (TFCI)), the group of particular events may include the following events. These events are listed in decreasing order of priority. The first event is that of empty slots during a compressed transmission mode (this particular event then being allocated the highest priority). The next event is that of the slots during the course of which the transmission has to be interrupted in a transmission mode known as a "gated" mode. Yet another event is that of the parts of the slots of silence in a discontinuous transmission mode, in the course of which neither feedback information (FBI) nor transport format combination indicators (TFCI) are transmitted A still further event is that of the parts of the slots in the course of which data are transmitted having a high spreading factor (e.g., 128 or 256), but in the course of which neither feedback information (FBI) nor transport format combination indicators (TFCI) are transmitted. Further, another event is that of the parts of the slots during the course of which data is transmitted having a low spreading factor (i.e., less than or equal to 64), but without transmitting either feedback information (FBI) or transport format combination indicators (TFCI). Still another event is that of the parts of the slots during the course of which feedback information (FBI) or transport format combination indicators (TFCI) are transmitted.

This latter event is the one which has the lowest priority and which consequently has the highest impact on the bit error rate. However, failing a particular event being found having a higher priority in the list set forth above, it will nevertheless be chosen to switch over the amplifier in the course of the transmission of the FBI or TFCI control information, rather than to risk losing the transmission.

The invention also pertains to a cellular mobile telephone including a reception system, a transmission system, a power amplification stage connected between the transmission system and the antenna, and a processing stage for adjusting the output power of the amplification stage based upon power information regularly received by the reception system. More particularly, the power amplification stage may include at least two power amplifiers which can be selected individually and which are together capable of covering the entire power range, and respectively including two different preferred operating regions and a common operating region. The power amplification stage may further include selection means able, in response to selection information, to link the output of the transmission system to the input of the power amplifier corresponding to the selection information.

Furthermore, the processing stage may include a correspondence table (e.g., stored in a memory) associating one of the amplifiers with each point of the power range based upon an efficiency criterion, and first control means. The first control means is able, in the presence of power information received corresponding to a point of the common region, to verify whether the power information corresponds to the amplifier currently selected. In the opposite case, the first control means define a switching time range extending from the instant of reception of the power information over a predetermined duration compatible with the limits of the common region. Further, the first control means define, based upon a predetermined transmission interruption criterion, the time limits of an interrupt time range in the switching range.

The processing stage may also include second control means for authorizing the continuation, possibly based upon new power information received, of the adjustment of the transmission power with the amplifier currently selected until the occurrence of the said interrupt range. Then, if the last power information received before the occurrence of the interrupt range still does not correspond to the amplifier currently selected, the second control means may inhibit the transmission during the interrupt range. The second control means may further deliver to the selection means the selection information corresponding to the power amplifier associated with the last power information, and reactivate the transmission with the new amplifier selected.

BRIEF DESCRIPTION OF THE DRAWINGS

Other advantages and characteristics of the invention will become apparent based upon the detailed description of implementations and embodiments, given by way of non-limitative example, in which:

FIG. 7 is a schematic block diagram partially illustrating a structure of a transmission frame in a compressed transmission mode;

FIG. 8 is a schematic block diagram partially illustrating a structure of a transmission frame in a discontinuous transmission mode;

DETAILED DESCRIPTION OF THE PREFERRED EMBODIMENTS

Figure 1:
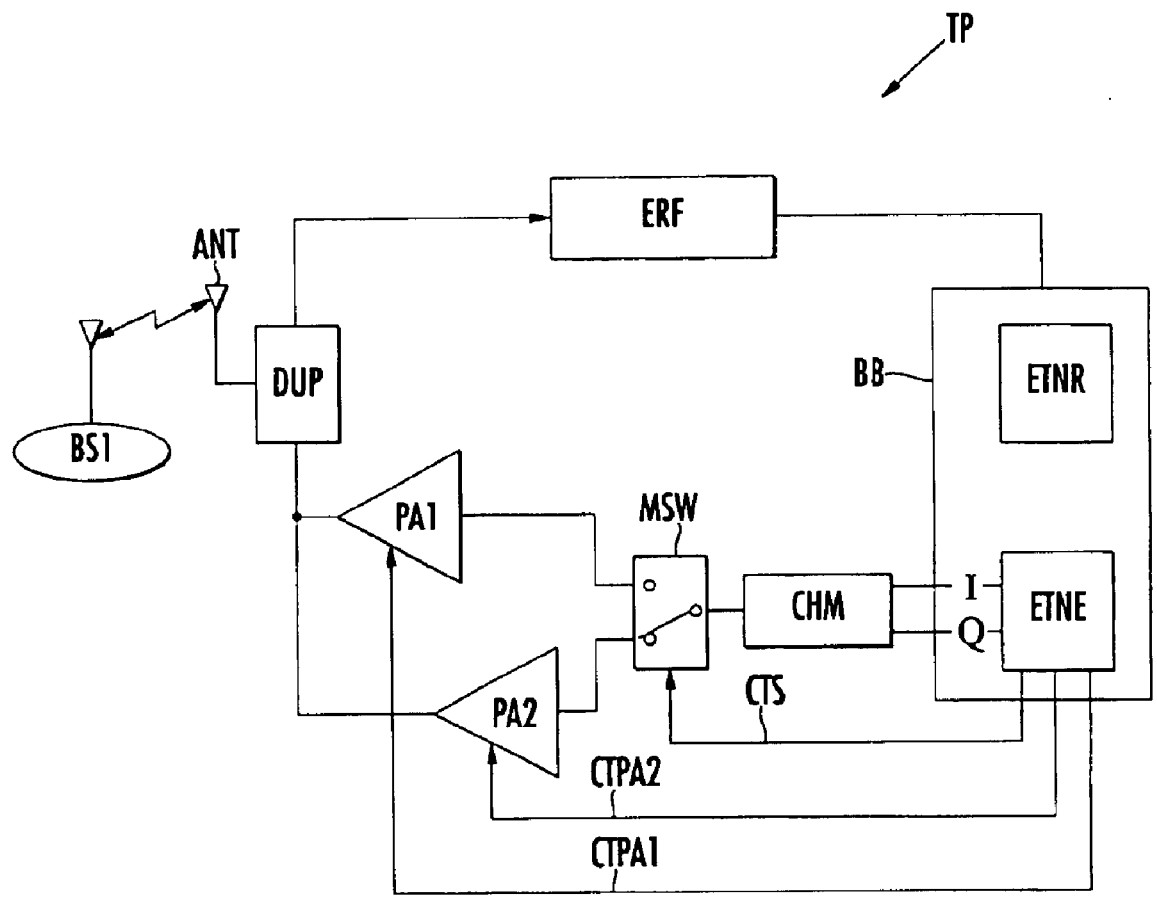
FIG. 1 is a schematic diagram of a cellular mobile telephone according to the invention, and, more particularly, the transmission system and the power amplifier stage thereof.
Figure 2:
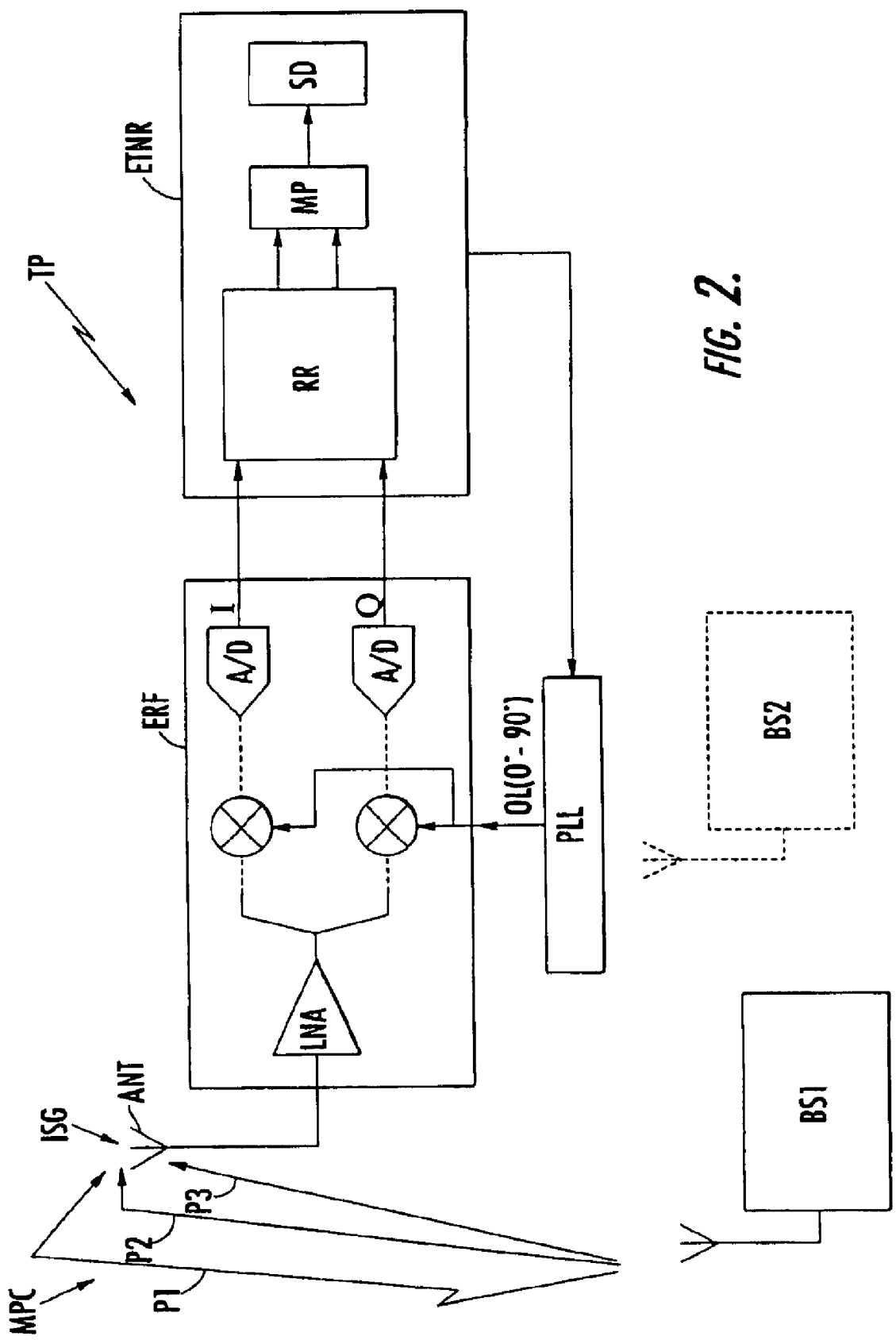
FIG. 2 is a schematic block diagram illustrating the receiving portion of a cellular mobile telephone according to the invention.

Turning now to FIG. 1, a remote terminal TP, such as a cellular mobile telephone, is in communication with a base station BS1, e.g., of the CDMA-FDD type. The cellular mobile telephone may include an analog radio frequency stage ERF connected to an antenna ANT by way of a duplexer DUP to receive an input signal ISG (FIG. 2). The stage ERF includes (FIG. 2) a low-noise amplifier LNA and two processing channels including conventional amplifiers, filters and mixers (not shown in FIG. 2 for clarity of illustration). The two mixers respectively receive, from a phase lock loop PLL, two signals mutually exhibiting a phase difference of 90°. After frequency transposition in the mixers, the two processing channels respectively define two flows I (direct flow) and Q (quadrature flow), as will be appreciated by those of skill in the art.

After digital conversion in analog/digital converters, the two flows I and Q are delivered to a reception-processing stage ETNR. The reception stage ETNR includes a receiver RR, often referred to as a "rake receiver", followed by conventional demodulation means or circuitry MP which carry out demodulation of the constellation delivered by the rake receiver RR.

Because of possible reflections of the signal initially transmitted by obstacles lying between the base station and the mobile telephone, the transmission medium is in fact a multi-path transmission medium MPC. That is, the multi-path transmission medium MPC includes several different transmission paths (three transmission paths P1, P2, P3 are illustratively shown in FIG. 2). As a result, the signal ISG which is received by the mobile telephone includes several time-delayed versions of the signal initially transmitted, versions which are the result of the multi-path transmission characteristics of the transmission medium. Further, each path introduces a different delay.

The rake receiver RR which equips a cellular mobile telephone operating in a CDMA communications system is used to carry out the time-based alignment, unscrambling, de-spreading and combining of delayed versions of the initial signals. This is done to deliver the information flows contained in the initial signals. Clearly, the received signal ISG could also result from the transmission of initial signals transmitted respectively by different base stations BS1 and BS2.

The processing stage ETNR also includes a source decoder SD which carries out source decoding, as will be appreciated by those of skill in the art. Finally, as is also well known to the person skilled in the art, the phase lock loop PLL is controlled by an automatic frequency control algorithm incorporated in a processor of the stage ETNR. It will also be appreciated that before transmission via the antenna of the base station BS1, the initial signal containing the information (symbols) is scrambled and spread by processing means of the base station. This is done by using the scrambling code of the base station and the orthogonal code (OVSF code) of the telephone TP.

Figure 5:
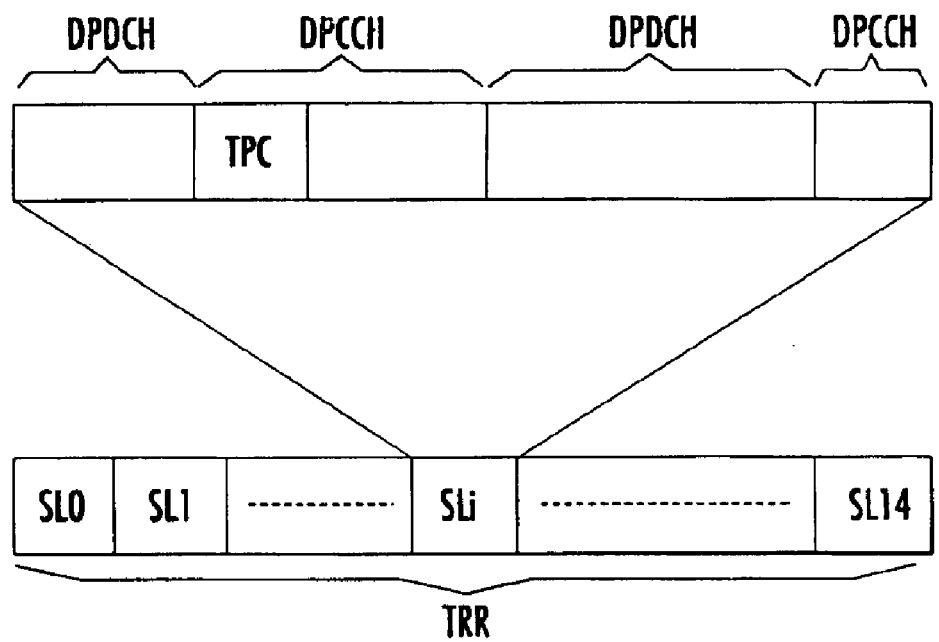
FIG. 5 is a schematic block diagram illustrating a reception time frame structure transmitted by a base station and intended for a cellular mobile telephone.

Consequently, the symbols are converted into chips having a predetermined length (e.g., equal to 260 ns) and corresponding to a predetermined chip rate equal, for example, to 3.84 Mcps. Thus, the chip rate is greater than the symbol rate. Hence a symbol can be converted into a number of chips possibly stretching from 4 to 256. As illustrated in FIG. 5, the information transmitted by the base station and formed of chips is transported within successive frames TRR, each subdivided into a predetermined number of slots SLi. By way of example, each frame TRR may have a length of 10 ms and may be subdivided into 15 slots SL0–SL14, each slot having a length equal to 2560 chips.

The information received by the telephone and originating from the base station includes the data transported on a data channel DPDCH, and control indications transported on a control channel DPCCH. In the downward direction (the "downlink"), each time slot SLi of the frame TRR includes imbricated data and control indications (FIG. 5), as will be understood by those of skill in the art. Nevertheless, further reference may be found in the technical specification 3G TS 25.211, V. 3.2.0 (March 2000), published by the 3GPP body, 650 Route des Lucioles—Sophia Antipolis-Valbonne-France, and entitled "3rd Generation Partnership Project, Technical Specification Group Radio Access Network, Physical channels and mapping of transport channels onto physical channels (FDD), (Release 1999).

Among these control indications is a word "TPC" (transmit power control) which includes power information required by the network. The mobile telephone TP adjusts the transmission power of the power amplifier stage to this power information. More particularly and with reference once again to FIG. 1, it may be seen that the baseband processing unit BB includes, in addition to the processing stage ETNR, a transmission processing stage ETNE. The stage ENTE may, in a conventional manner known to those of skill in the art, perform the source-coding processing, symbol-spreading processing, and modulation processing to deliver the two flows I and Q to a transmission system CHM of conventional structure.

This transmission system CHM includes input end digital/analog converters as well as mixers, which make it possible to perform a frequency transposition to the transmission frequency. Here again, transposition signals are delivered by a phase lock loop (not shown for clarity of illustration) also controlled by automatic frequency control means incorporated into the stage ETNE. The power amplification stage of the mobile telephone TP illustratively includes two power amplifiers PA1 and PA2, which may be of a conventional type known in the art, the respective inputs of which are linked to the outputs of selection means MSW.

As illustratively shown, the selection means or circuitry MSW is formed by a duplexer controlled by a selection signal CTS produced and delivered by the processing stage ETNE. The input of the duplexer MSW is linked to the output of the transmission system CHM. The respective outputs of the two amplifiers PA1 and PA2 are linked to the antenna ANT via the duplexer DUP. Each amplifier PA1, PA2 is controlled by a control signal CTPA1, CTPA2 which make it possible to inhibit the operation thereof. These two signals CTPA1 and CTPA2 are also delivered by the processing stage ETNE.

Figure 3:
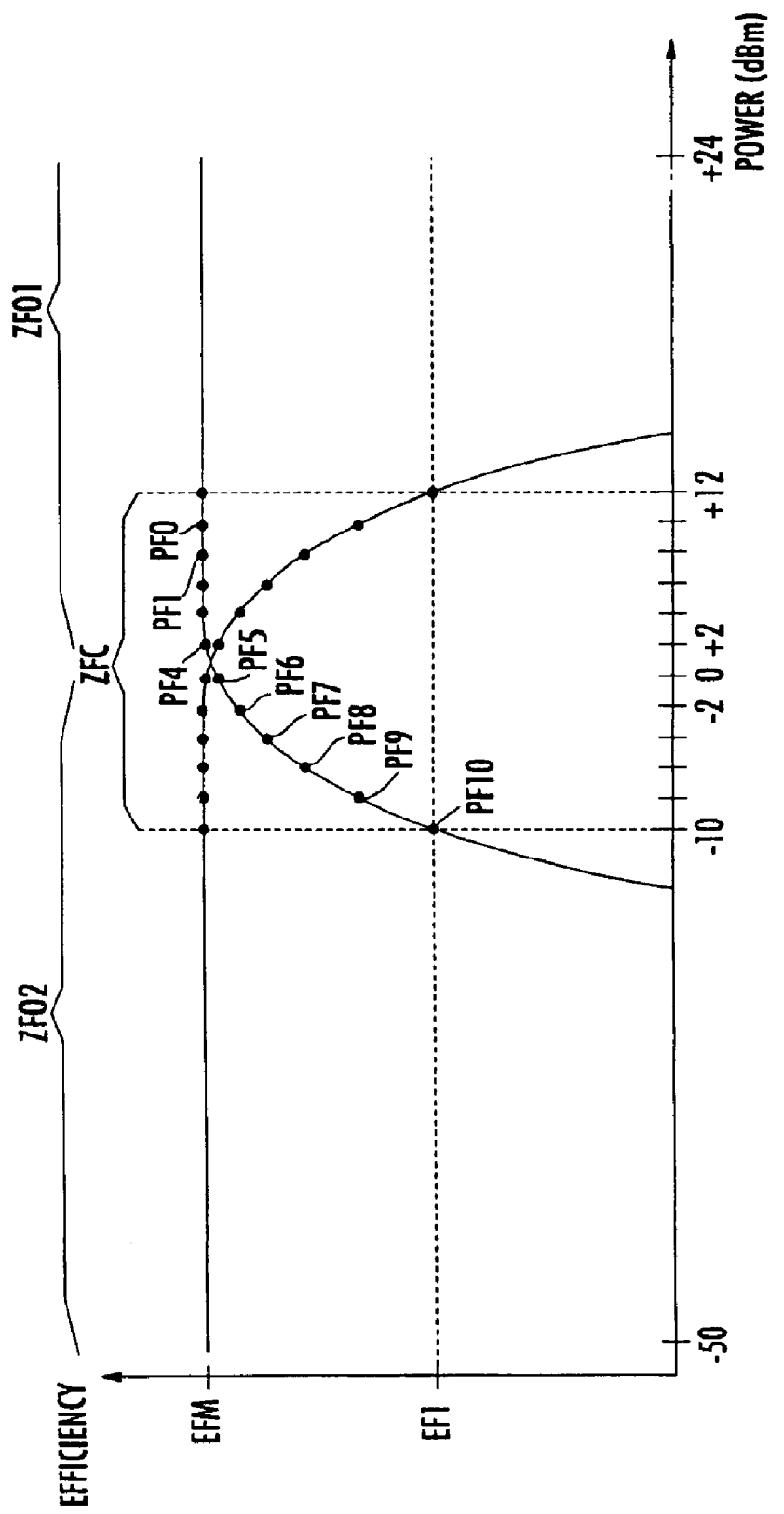
FIG. 3 is a graph illustrating two efficiency curves associated with two power amplifiers equipping the power amplification stage of a mobile telephone according to the invention.

As illustrated in FIG. 3, each power amplifier includes an optimal operating region and an operating region which is common with the other power amplifier. Thus, by way of example, the amplifier PA1 features an optimal operating region ZFO1, i.e., a region for which the efficiency (yield) of the amplifier has a maximum value EFM. For example, the maximum value EFM may be in a power region lying between +2 dBm and +24 dBm. Then, the efficiency of the amplifier PA1 next decreases for powers less than +2 dBm. For a power of −10 dBm (operating point PF9), the efficiency of the amplifier PA1 is equal to EF1 which is an efficiency value chosen, for example, 3 dB below the maximum value EFM. Likewise, the optimal operating region ZFO2 of the amplifier PA2 extends from −50 dBm up to about −2 dBm. The efficiency of the amplifier PA2 then decreases to reach the value EF1 at +12 dBm.

The two power amplifiers thus together cover the entire power range from −50 dBm to +24 dBm. Moreover, they possess a common operating region ZFC, the limits of which are illustratively fixed at −10 dBm and +12 dBm. The limits of this common operating region have been defined in such a way that the amplifier which exhibits a lesser efficiency in this region nevertheless has acceptable efficiency. Each point of the range of powers is associated with one of the amplifiers based upon an efficiency criterion. Thus, all the operating points lying between −10 dBm and −50 dBm are associated with the amplifier PA2. Likewise, all the operating points lying between +12 dBm and +24 dBm are associated with the amplifier PA1.

Figure 4:
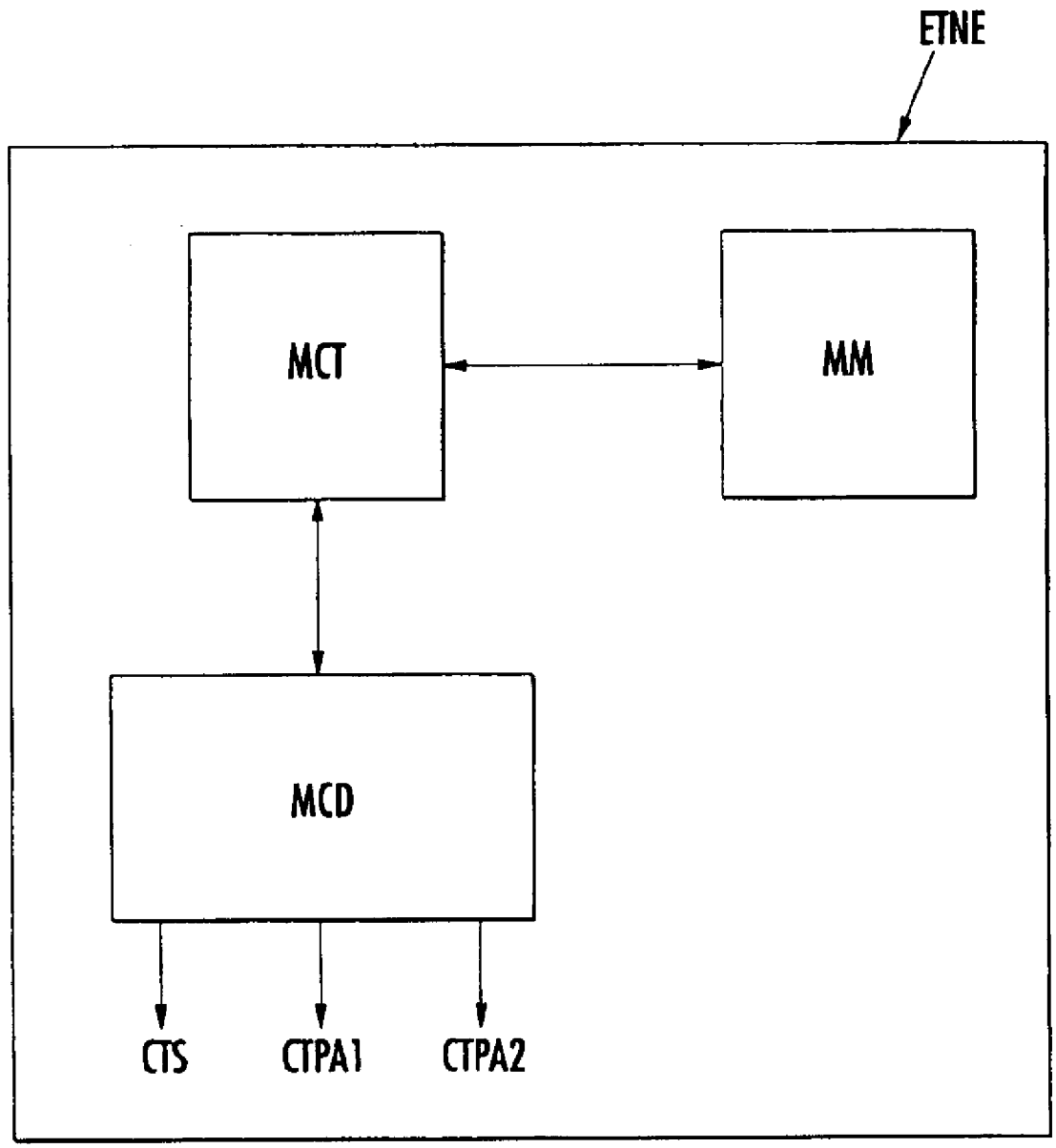
FIG. 4 is a schematic block diagram illustrating in greater detail the internal structure of a digital processing transmission stage of a cellular mobile telephone according to the invention.

In the common operating region, all the operating points lying between −10 dBm and 0 dBm are associated with the amplifier PA2, since it is the one which exhibits the greatest efficiency for these operating points. Likewise, all the operating points lying between +2 dBm and +12 dBm are associated with the amplifier PA1 which exhibits the greatest efficiency in this region. This table of correspondence between an operating point and a power amplifier is stored in a memory MM of the stage ETNE (FIG. 4).

In addition to the means which have already been set out above, the stage ETNE further includes control means or circuitry MCT and control means or circuitry MCD. These are implemented, for example, by way of software within a microprocessor. The power information TPC (FIG. 5) is received within each time slot SLi, and the variation in power between two successive items of power information is 2 dBm, for example. As long as the power information TPC received by the processing stage ETNE lies within the optimal operating region of the amplifier PA1 (which is assumed to be selected here) and outside the common operating region ZFC, there is no requirement to change the power amplifier. Thus, the transmission power can continue to be adjusted with the TPC information using the selected amplifier PA1.

When the power demanded by the network decreases and corresponds to an operating point situated in the common operating region ZFC, the control means will verify whether this power information $TPC_i$ received (stage 90, FIG. 9) corresponds to the amplifier currently selected (stage 91), i.e., amplifier PA1. If this is the case, there is no change of selection of the power amplifier. This is the case, for example, for the operating points PF0 to PF4. In contrast, if power information $TPC_i$ received in stage 90 (FIG. 9) corresponds to the operating point PF5, it is then appropriate to switch power amplifiers (i.e., to select the amplifier PA2).

In this regard, the control means MCT will then define a switching time range PCM (stage 92) extending from the instant of reception of the power information $TPC_i$ (corresponding to the operating point PF5, over a predetermined duration compatible with the limits of the common region ZFC. The control means MCT will also define, on the basis of a predetermined criterion for transmission interruption CRF (discussed further below), the time limits of an interrupt time range PIT lying within the switching range PCM.

In other words, the control means will, on the basis of the point PF5, define a switching range within which it will be possible to change power amplifiers while continuing, before this switching point, to adjust the transmission power by using the amplifier currently selected (i.e., the amplifier PA1). This is the case even though it exhibits a lesser efficiency than that of the amplifier PA2. The limit of the switching range will be defined here, for example, by the point PF9. This is because between the points PF5 and PF9 the efficiency of the amplifier PA1 remains acceptable, whereas beyond point PF9 it is deemed too low. In terms of slots, the duration of the switching range corresponds here to four slots.

Needless to say, those skilled in the art will be able to adjust the length of the switching range based upon the various efficiency curves of the amplifiers within the common operating region. In general, it will be possible to choose a switching range lying between about four slots and eight slots. Once this switching range PCM has been delimited, the control means will, on the basis of the transmission interrupt criterion, define the interrupt time range PIT. The time range PIT will correspond to the best moments for changing amplifier. This change may require prior stopping of the transmission from the telephone.

Figure 9:
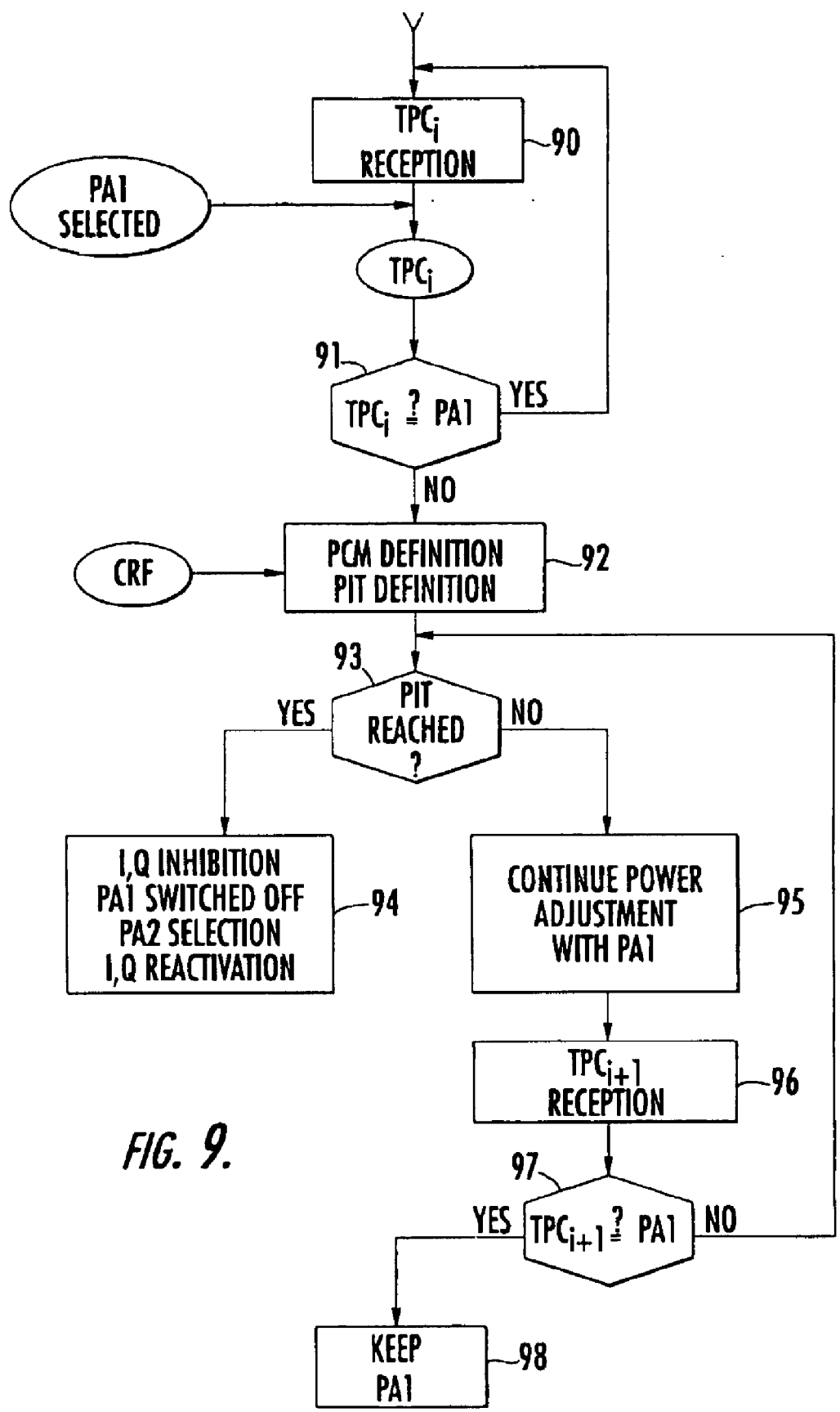
FIG. 9 is a flow diagram illustrating an implementation of a method according to the invention, allowing the switching, at a chosen instant, of a power amplifier.

Turning now to FIG. 9, the switching algorithm will now be discussed in further detail. The control means, in stage 93, will detect the occurrence of the interrupt range PIT. As long as this interrupt range is not reached, the control means will authorize continuance (stage 95) of the adjustment of the transmission power with the amplifier currently selected (here the amplifier PA1). This may be done possibly on the basis of new power information TPC received. Thus, if, by way of example, the interrupt time range PIT should occur at an instant corresponding to an operating point lying between the points PF7 and PF8, the transmission power will continue to be adjusted until the occurrence of the interrupt range PIT by using the information TPC corresponding to the points PF6 and PF7 (stages 96 and 97).

That being so, it should be noted that upon each reception of new power information $TPC_{i+1}$, the control means verify whether the new power information received corresponds to the amplifier currently selected, i.e., the amplifier PA1 (stage 97). If this is the case (e.g., if the power information received immediately after that associated with the point PF5 corresponds to the operating point PF4), there is no further point in changing the power amplifier and the power amplifier currently selected PA1 is kept selected (stage 98).

Figure 10:
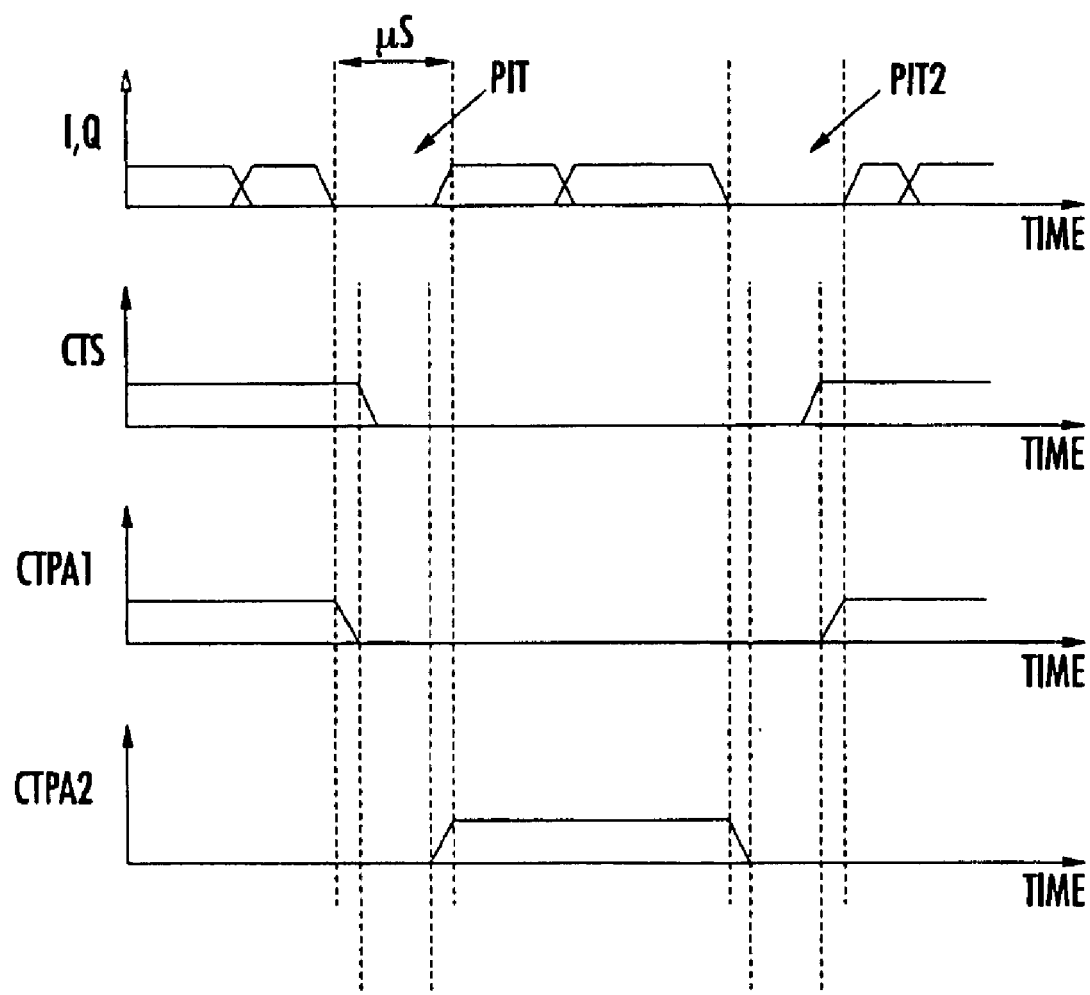
FIG. 10 is a timing diagram illustrating an implementation of a method according to the invention.

When the control means detect the occurrence of the interrupt time range, they then initiate the switching process (stage 94) illustrated in FIG. 10. In general, as illustrated in FIG. 10, the control means will inhibit the I, Q transmission throughout the duration of the interrupt range PIT. They will then deliver to the selection means MSW the selection information CTS corresponding to the power amplifier associated with the last power information received. The transmission will then be reactivated with the new amplifier selected.

Although different switching modes may be used for switching the two power amplifiers, the one described by reference to FIG. 10 makes it possible to minimize the disturbances. More particularly, it also avoids the two amplifiers both being operational for a brief moment. Hence, the control signal CTPA1 of the amplifier PA1 is first of all set to 0 (i.e., amplifier PA1 deactivated) once the transmission has been inhibited. Then, the selection signal CTS is delivered to the selection means MSW, which then link the output of the transmission system CHM to the input of the amplifier PA2. The control signal CTPA2 may then be set to 1, thus activating the operation of the amplifier PA2. When this amplifier PA2 is activated, the control means reactivate the I, Q transmission.

This timing pattern is reproduced, if appropriate, subsequently in the course of another interrupt time range PIT2 in the event that it becomes appropriate to switch back to the amplifier PA1. The duration of the interrupt time range PIT is also chosen to minimize the risks of disturbances to the transmission while authorizing effective and clean switching of the amplifiers. By way of example, it will be possible to choose a duration on the order of a few chips (e.g., two to four chips), which may correspond to a duration of about one microsecond.

The derivation of the predetermined transmission interrupt criterion CRF will now be discussed in further detail. Generally speaking, the transmission interrupt criterion CRF includes the choice of at least one predetermined particular event. This event may occur within a transmission and may have a predetermined impact on the bit error rate, in the case of a transmission interruption, upon the occurrence of this particular event. Hence, a particular event will preferably be chosen that minimizes the bit error rate in the event of transmission interruption upon the occurrence of this particular event. Hence, if this particular event is detected within the switching range PCM, the control means then place the interrupt time range PIT during the occurrence of this particular event.

According to one embodiment of the invention, the transmission interrupt criterion advantageously includes the choice of a group of several predetermined particular events capable of occurring in the course of a transmission. The sequencing of these particular events may be according to a predetermined order of priority on the basis of their respective impacts on the bit error rate, in the event of an interruption of transmission, upon the occurrence of these particular events. Hence, the particular event having the highest priority will lead to the lowest bit error rate, in the event of transmission interruption, upon the occurrence of this particular event with the highest priority. The particular event having the least-high priority will lead to a higher bit error rate.

The control means will then analyze the characteristics of the transmission by considering the order of priority to detect the possible presence, during the switching range PCM, of a predetermined particular event of the said group. The control means will then place the interrupt time range PIT during the occurrence of the first particular event thus detected in the order of priority.

Figure 6:
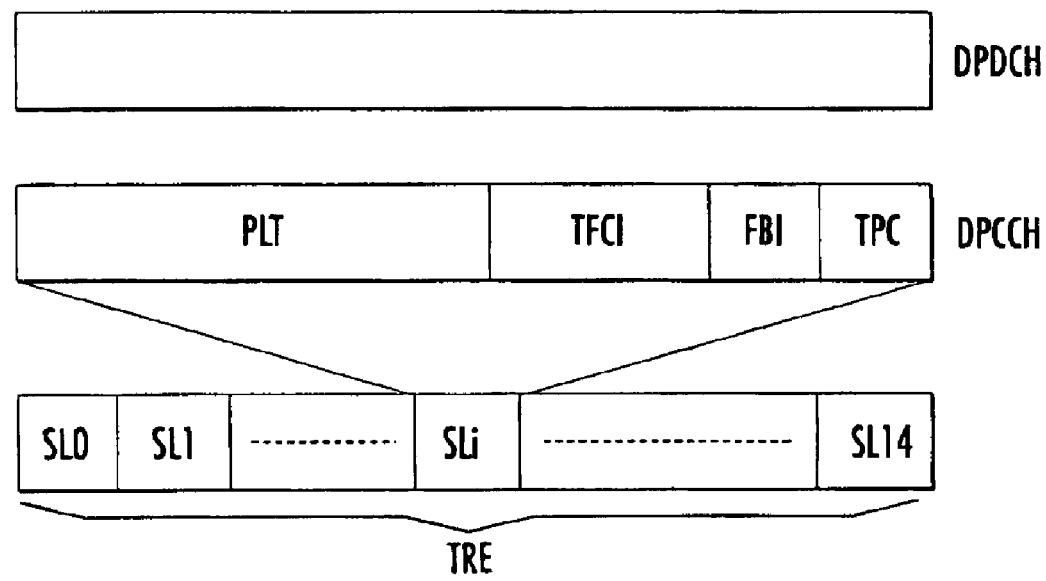
FIG. 6 is a schematic block diagram illustrating a transmission frame transmitted by a cellular mobile telephone and intended for a base station in a normal transmission mode.

Referring now more particularly to FIGS. 6 through 8, the particular events making it possible to define the interrupt time range PIT will now be discussed. A transmission frame TRE is diagrammatically illustrated in FIG. 6 within which the information originating from the telephone and intended for the base station is sent (upward direction: "Uplink") in a normal operating mode. More precisely, similar to the reception frame TRR (FIG. 5), the transmission frame TRE is also subdivided into 15 slots SLi. Within each slot SLi are transported, in parallel, the data channel DPDCH and the control channel DPCCH. More precisely, the control indications transported include a word PLT relating to a pilot signal, a word TFCI corresponding to a transport format combination indicator, a word FBI corresponding to feedback information, and a word TPC corresponding to transmitted power information. Again, reference may be made to the above noted specification 3G TS 25.211 V3.2.0 for further details concerning the structure of a transmission frame TRE.

Furthermore, the data included in the data channel DPDCH may be spread with a variable spreading factor. This spreading factor may thus vary from 4 to 256 depending on the quality of service required. In addition to the normal transmission mode, the information transmitted may be transmitted within a transmission mode known as "compressed mode". In such a compressed transmission mode, provision is made, as illustrated diagrammatically in FIG. 7, for empty slots TGP separating transmission slots SLj and Slk, in the course of which no information is transmitted. Here again, further details on the compressed transmission mode may be found in the above noted technical specification 3G TS 25.212 V3.3.0 originating from the same text (3 GPP) as that mentioned above.

In addition to the compressed transmission mode, the portable telephone may also, under certain circumstances, communicate with the base station in a transmission mode known as "gated mode". In the gated transmission mode, the transmission has to be interrupted in the course of certain slots of each frame. The number of slots in the course of which the transmission has to be interrupted, as well as their position in the frame, depends upon the degree of gating. Such a gated transmission mode is also known to the person skilled in the art. For further details, reference may be made to the specification 3G TR 25.XXX V0.0.0, September 2000, from the abovementioned text (3 GPP)

The portable telephone can also communicate with the base station in a discontinuous transmission mode ("DTX mode"). Such a transmission mode is also well known to the person skilled in the art. It is characterized especially, as illustrated in FIG. 8, by slots of silence INS in the course of which no data is transmitted on the data channel DPDCH toward the base station. In contrast, the control channel DPCCH continues to be transmitted and may particularly include the words FBI and TFCI.

The group of particular events then includes, in decreasing order of priority: the empty slots TGP during a compressed-transmission mode; the slots in the course of which the transmission can be interrupted in a gated transmission mode; the parts P1INS or P2INS (FIG. 8) of the slots of silence INS in a discontinuous transmission mode, in the course of which neither feedback information FBI, nor transport format combination indicators TFCI are transmitted; the parts of the slots in the course of which data are transmitted having a high spreading factor (e.g., 128 or 256), without transmitting either feedback information FBI or transport format combination indicators TFCI; the parts of the slots in the course of which data are transmitted having a low spreading factor, without transmitting either feedback information FBI or transport format combination indicators TFCI; and the parts of the slots in the course of which feedback information FBI or transport format combination indicators TFCI are transmitted.

In other words, the control means will first detect whether the switching range PCM will include at least one empty slot TGP in compressed transmission mode. If this is the case, the control means will place the transmission interrupt range PIT in this empty slot. If this is not the case, the control means will detect the possible presence of a gated transmission mode and will then place the transmission interrupt range PIT in one of the slots in which the transmission can be interrupted. If such is not the case, the control means will detect the possible presence of a discontinuous transmission mode and will then place the transmission interrupt range PIT in a part P1INS or P2INS (FIG. 8).

If that is not possible, the control means will then detect the possible presence of parts of slots in which data are transmitted with a high spreading factor, but in which neither feedback information FBI nor transport format combination indicators TFCI are transmitted. If this detection is positive, the control means will place the transmission interrupt range in these parts of slots.

If the detection is negative, the control means will try to detect parts of slots in which data are transmitted having a low spreading factor, but in which still no feedback information FBI, nor transport format combination indicators TFCI, are transmitted. The control means will then place the transmission interrupt range PIT in these parts of slots. Further, if none of the foregoing detections has been positive, the control means will then place the transmission interrupt range PIT in the parts of the slots in which feedback information FBI or transport format combination indicators TFCI are transmitted.

Needless to say, everything that has been described above for two amplifiers applies if more than two amplifiers are used, as long as they feature operating regions overlapping at least in pairs.

That which is claimed is:

1. A method for controlling transmission power of a cellular telephone over a power range, the cellular telephone comprising a plurality of power amplifiers individually selectable and together providing outputs over the power range, the power amplifiers each having a predetermined operating region which define a common operating region therebetween, and the power amplifiers also having different different efficiencies, the method comprising:

transmitting power information to the cellular telephone at predetermined intervals;

determining if the power information is in the common operating region and, if so, verifying whether the power information corresponds to a currently selected one of the power amplifiers having a greater efficiency;

if the power information does not correspond to the currently selected power amplifier having the greater efficiency, defining a changeover switching time range extending based upon reception of the power information and over a predetermined duration within the common operating region and defining an interrupt time range within the changeover switching time range;

adjusting the transmission power using the currently selected power amplifier until reaching the interrupt time range; and determining if power information last received before reaching the interrupt time range corresponds to the currently selected amplifier and, if not, interrupting transmission during the interrupt time range, selecting one of the power amplifiers associated with the power information last received before reaching the interrupt time range, and reactivating transmission using the newly selected amplifier.

2. The method of claim 1, wherein in the power information comprises chips, transmitted in successive frames each subdivided into a predetermined number of slots; wherein a duration of the changeover switching time range is greater than about a duration of at least one slot; and wherein a duration of the interrupt time range is greater than about a duration of at least one chip.

3. The method of claim 2 wherein the duration of the changeover switching time range is greater than a duration of about 4 slots, and wherein the duration of the interrupt time range is greater than a duration of about 2 chips.

4. The method of claim 1 wherein the interrupt time range is based upon a predetermined transmission interruption criterion.

5. The method of claim 4 wherein the predetermined transmission interrupt criterion includes at least one predetermined event having a predetermined impact on a bit error rate of a transmission interruption; and wherein defining the interrupt time range comprises analyzing the transmission to detect the predetermined event within the changeover switching time range and, if detected, defining the interrupt time range during the occurrence of the at least one predetermined event.

6. The method of claim 5 wherein the at least one predetermined event comprises a plurality of predetermined events; wherein a sequencing of the predetermined events is according to an order of priority based upon respective impacts on the bit error rate; and wherein analyzing the transmission to detect the predetermined event within the changeover switching time range comprises analyzing the transmission based upon the order of priority.

7. The method of claim 6 wherein in the power information comprises data and control indications both transmitted within successive frames each subdivided into a predetermined number of slots, the control indications comprising feedback information and transport format combination indicators.

8. The method of claim 7 wherein the plurality of predetermined events comprise, in decreasing order of priority, an occurrence of:

empty slots during a compressed transmission in a gated transmission mode;

portions of silence slots in a discontinuous transmission mode during which neither the feedback information nor the transport format combination indicators are transmitted;

portions of the slots during data transmission having a first upper spreading factor without transmitting either the feedback information or the transport format combination indicators;

portions of the slots during data transmission having a second lower spreading factor without transmission either the feedback information or the transport format combination indicators; and portions of the slots during the transmission of feedback information or transport format combination indicators.

9. The method of claim 1 wherein adjusting the transmission power comprises adjusting the transmission power based upon newly received power information.

10. A method for controlling transmission power of a cellular telephone over a power range, the cellular telephone comprising a plurality of power amplifiers individually selected and together providing outputs over the power range, the power amplifiers each having a predetermined operating region which define a common operating region therebetween, and the power amplifiers also having different efficiencies, the method comprising:

transmitting power information to the cellular telephone at predetermined intervals;

determining if the power information is in the common operating region and, if so, verifying whether the power information corresponds to a currently selected one of the power amplifiers having a greater efficiency; and if the power information does not correspond to the currently selected power amplifier having the greater efficiency, selected another power amplifier having a higher efficiency.

11. The method of claim 10 wherein selecting another one of the power amplifiers comprises:

defining a changeover switching time range extending based upon reception of the power information and over a predetermined duration within the common operation region; and defining an interrupt time range within the changeover switching time range during which the switching is to be performed.

12. The method of claim 11 wherein in the power information comprises chips transmitted in successive frames each subdivided into s predetermined number of slots; wherein a duration of the changeover switching time range is greater than about a duration of at least one slot; and wherein a duration of the interrupt time range is greater than about a duration of at least one chip.

13. The method of claim 12 wherein the duration of the changeover switching time range is greater than a duration of about 4 slots, and wherein the duration of the interrupt time range is greater than a duration of about 2 chips.

14. The method of claim 11 wherein the interrupt time range is based upon a predetermined transmission interruption criterion.

15. The method of claim 14 wherein the predetermined transmission interrupt criterion includes at least one predetermined event having a predetermined impact on a bit error rate of a transmission interruption; and wherein defining the interrupt time range comprises analyzing the transmission to detect the predetermined event within the changeover switching time range and, if detected, defining the interrupt time range during the occurrence of the at least one predetermined event.

16. The method of claim 15 wherein the at least one predetermined event comprises a plurality of predetermined events; wherein a sequencing of the predetermined events is according to an order of priority based upon respective impacts on the bit error rate; and wherein analyzing the transmission to detect the predetermined event within the changeover switching time range comprises analyzing the transmission based upon the order of priority.

17. The method of claim 16 wherein the power information comprises data and control indications both transmitted within successive frames each subdivided into a predetermined number of slots, the control indications comprising feedback information and transport format combination indications.

18. The method of claim 17 wherein the plurality of predetermined events comprises, in decreasing order of priority, an occurrence of:

empty slots during a compressed transmission mode;

slots during an interrupted transmission in a gated transmission mode;

portions of silence slots in a discontinuous transmission mode during which neither the feedback information nor the transport format combination indicators are transmitted;

portions of the slots during data transmission having a first upper spreading factor without transmitting either the feedback information or the transport format combination indicators;

portions of the slots during data transmission having a second lower spreading factor without transmitting either the feedback information or the transport format combination indicators; and portions of the slots during the transmission of feedback information or transport format combination indicators.

19. A cellular telephone comprising:

an antenna;

a reception system;

a transmission system;

a power amplification stage connected between said transmission system and said antenna and comprising a plurality of power amplifiers individually selectable and together providing outputs over a power range, each of said power amplifiers having a predetermined operating region which define a common operating region therebetween, and said power amplifiers having different efficiencies, and selection means for selectively connecting an output of the transmission system to an input of one of said power amplifiers based upon selection information; and a processing stage for adjusting the power output from said power amplification stage based upon power information received by said reception system at predetermined intervals, said processing stage comprising a memory for storing a correspondence table associated on of the power amplifiers with each of a plurality of points along the power range, first control means for verifying whether power information corresponding to a point within the common operating region also corresponds to a currently selected one of the power amplifiers having a greater efficiency based upon the correspondence table and, if it does not, for defining a changeover switching time range based upon reception of the power information and over a predetermined duration within the common operating region, and for defining an interrupt time range within the changeover switching time range, and second control means for controlling adjustment of the transmission power using the currently selected amplifier until reaching the interrupt time range and, if the power information last received before reaching the interrupt time range does not correspond to the currently selected amplifier, interrupting the transmission during the interrupt time range and delivering the selection information to said selection means corresponding to one of said power amplifiers associated with the power information last received, and for re-activating transmission using said newly selected amplifier.

20. The cellular telephone of claim 19 wherein the power information comprises chips transmitted in successive frames each subdivided into a predetermined number of slots; wherein a duration of the changeover switching time range is greater than about a duration of at least one slot; and wherein a duration of the interrupt time range is greater than about a duration of at least one chip.

21. The cellular telephone of claim 20 wherein the duration of the changeover switching time range is greater than a duration of about 4 slots, and wherein the duration of the interrupt time range is greater than a duration of about 2 chips.

22. The cellular telephone of claim 19 wherein the interrupt time range is based upon a predetermined transmission interruption criterion.

23. The cellular telephone of claim 22 wherein the predetermined transmission interrupt criterion includes at least one predetermined event having a predetermined impact on a bit error race of a transmission interruption; and wherein said first control means analyzes the transmission to detect the predetermined event within the changeover switching time range and, if detected, said first control means defines the interrupt time range during the occurrence of the at least one predetermined event.

24. The cellular telephone of claim 23 wherein the at least one predetermined event comprises a plurality of predetermined events; wherein a sequencing of the predetermined events is according to an order of priority based upon respective impacts on the bit error rate; and wherein said first control means analyzes the single transmission based upon the order of priority.

25. The cellular telephone of claim 24 wherein the power information comprises data and control indications both transmitted within successive frames and each subdivided into a predetermined number of slots, the control indications comprising feedback information and transport format combination indicators.

26. The cellular telephone of claim 25 wherein the plurality of predetermined events comprise, in decreasing order of priority, an occurrence of:
empty slots during a compressed transmission mode;
slots during an interrupted transmission in a gated transmission mode;
portions of a silence slots in a discontinuous transmission mode during which neither the feedback information nor the transport format combination indicators are transmitted;
portions of the slots during data transmission having a first upper spreading factor without transmitting either the feedback information or the transport format combination indicators;
portions of the slots during data transmission having a second lower spreading factor without transmitting either the feedback information of the transport format combination indicators; and
portion of the slots during the transmission of feedback information or transport format combination indicators.

27. The cellular telephone of claim 19 wherein said second control means adjusts the transmission power based upon newly received power information.

28. The cellular telephone of claim 19 wherein the plurality of points are determined based upon efficiency criterion.

29. A cellular telephone comprising:
an antenna;
a reception system;
a transmission system;
a power amplification stage connected between said transmission system and said antenna and comprising
a plurality of power amplifiers individually selectable and together providing outputs over a power range, each of said power amplifiers having a predetermined operating region which define a common operating region therebetween, and said power amplifiers having different efficiencies, and
selection circuitry for selectively connecting an output of the transmission system to an input of one of said power amplifiers based upon selection information; and
a processing stage for adjusting the power output from said power amplification stage based upon power information received by said reception system at predetermined intervals, said processing stage
storing a correspondence table associating one of the power amplifiers with each of a plurality of points along the power range, and
verifying whether power information corresponding to a point within the common operating region also corresponds to a currently selected one of the power amplifiers having a greater efficiency based upon the correspondence table, and
if the power information does not correspond to said currently selected power amplifier having the greater efficiency, selecting another power amplifier having a higher efficiency.

30. The cellular telephone of claim 29 wherein said processing stage selects another one of the power amplification by defining a changeover switching time range extending based upon reception of the power information and over a predetermined duration within the common operating region, and defining an interrupt time range within the changeover switching time range during which the switching is to be performed.

31. The cellular telephone of claim 30 wherein the power information comprises chips transmitted in successive frames each subdivided into a predetermined number of slots; wherein a duration of the changeover switching time range is greater than about a duration of at least one slot; and wherein a duration of the interrupt time range is greater than about a duration of at least one chip.

32. The cellular telephone of claim 31 wherein the duration of the changeover switching time range is greater then a duration of than about 4 slots, and wherein the duration of the interrupt time range is greater than a duration of about 2 chips.

33. The cellular telephone of claim 30 wherein the interrupt time range is based upon a predetermined transmission interruption criterion.

34. The cellular telephone of claim 33 wherein the predetermined transmission interrupt criterion includes at least one predetermined event having a predetermined impact on a bit error rate of a transmission interruption; and wherein said processing stage analyzes the transmission to detect the predetermined event within the changeover switching time range and, it detected, said processing stage defines the interrupt time range during the occurrence of the at least one predetermined event.

35. The cellular telephone of claim 34 wherein the at least one predetermined event comprises a plurality of predetermined events; wherein a sequencing of the predetermined events is according to an order of priority based upon respective impacts on the bit error rate; and wherein said processing stage analyzes the single transmission based upon the order of priority.

36. The cellular telephone of claim 35 wherein the power information comprises data and indications both transmitted within successive frames and each subdivided into a predetermined number of slots, the control indications comprising feedback information and transport format combination indicators.

37. The cellular telephone of claim 36 wherein the plurality of predetermined events comprise, in decreasing order of priority, an occurrence of:

empty slots during a compressed transmission mode;

slots during an interrupted transmission in a gated transmission mode;

portions of silence slots in a discontinuous transmission mode during which neither the feedback information nor the transport format combination indicators are transmitted;

portions of the slots during data transmission having a first upper spreading factor without transmitting either the feedback information or the transport format combination indicators;

portions of the slots during data transmission having a second lower spreading factor without transmitting either the feedback information or the transport format combination indicators; and portions of the slots during the transmission of feedback information or transport format combination indicators.

* * * * *

UNITED STATES PATENT AND TRADEMARK OFFICE
CERTIFICATE OF CORRECTION

PATENT NO. : 6,980,822 B2  Page 1 of 1
APPLICATION NO. : 10/000612
DATED : December 27, 2005
INVENTOR(S) : Patrick Conti and Friedbert Berens It is certified that error appears in the above-identified patent and that said Letters Patent is hereby corrected as shown below:

Column 12, Line 53   Delete: "wherein in"
                     Insert: -- wherein --

Column 12, Lines 62-63   Delete: "empty slots during a compressed transmission in a gated transmission mode;"

Insert: -- empty slots during a compressed transmission mode;
                         slots during an interrupted transmission in a gated transmission mode; --

Column 13, Line 44   Delete: "into s"
                     Insert: -- into a --

Column 14, Lines 54-55   Delete: "associated on of"
                         Insert: -- associating one of --

Column 16, Line 58   Delete: "then"
                     Insert: -- than --

Signed and Sealed this

First Day of August, 2006

JON W. DUDAS
*Director of the United States Patent and Trademark Office*